United States Patent [19]

Lozano

[11] Patent Number: 5,713,706

[45] Date of Patent: Feb. 3, 1998

[54] PLASTIC COMPOSITE FASTENER FOR SELF-CUTTING AND FRICTIONAL WELDING

[75] Inventor: Anthony H. Lozano, Riverside, Calif.

[73] Assignee: Shur-Lok Corporation, Irvine, Calif.

[21] Appl. No.: 574,592

[22] Filed: Dec. 19, 1995

[51] Int. Cl.⁶ .................................................. F16B 37/06
[52] U.S. Cl. ........................... 411/171; 411/902; 411/179; 411/29
[58] Field of Search ......................... 411/903, 902, 411/171, 179, 387, 386, 427, 432, 29, 30, 31

[56] References Cited

U.S. PATENT DOCUMENTS

| | | | |
|---|---|---|---|
| 2,832,616 | 4/1958 | Morse | 411/902 |
| 3,385,154 | 5/1968 | Miklos | 411/29 |
| 3,750,518 | 8/1973 | Rayburn | 411/29 |
| 3,842,486 | 10/1974 | Gerard . | |
| 3,964,531 | 6/1976 | Schenk . | |
| 4,212,610 | 7/1980 | Weidlich . | |
| 4,629,380 | 12/1986 | Gunkel | 411/29 |
| 4,752,171 | 6/1988 | Pliml . | |
| 4,817,264 | 4/1989 | Worthing . | |
| 4,920,833 | 5/1990 | Rosenthal | 411/29 |

FOREIGN PATENT DOCUMENTS

| | | | |
|---|---|---|---|
| 3447415 | 6/1986 | Germany | 411/31 |
| 12344 | 6/1993 | Germany | 411/171 |
| 865200 | 4/1961 | United Kingdom | 411/387 |
| 1460727 | 1/1977 | United Kingdom | 411/31 |

*Primary Examiner*—Flemming Saether
*Attorney, Agent, or Firm*—Price, Gess & Ubell

[57] ABSTRACT

A plastic composite fastener capable of cutting its own hole in a resin composite panel and friction welding itself to be flush with the outer surface of the resin panel is provided. An inner metal core member can be provided with at least one cutting edge member extending from the core member. An outer plastic sheath member having an annular flange is fastened to and extends about the inner metal core member. The cutting edge member is exterior of the plastic sheath member at one end of the fastener insert unit and is configured to cut a hole in the resin panel, while the annular flange is configured to friction weld to a resin panel surface.

13 Claims, 2 Drawing Sheets

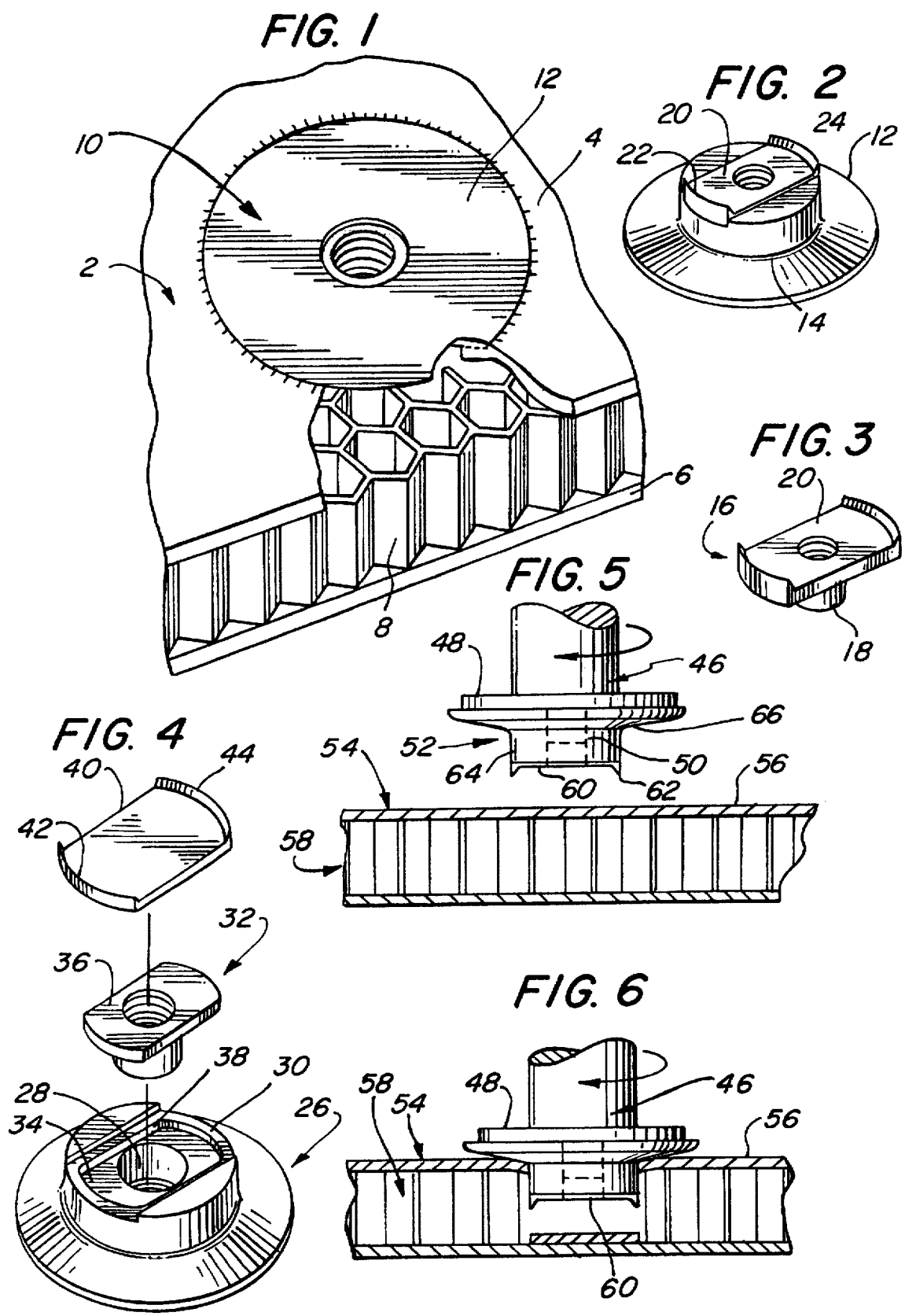

PLASTIC COMPOSITE FASTENER FOR SELF-CUTTING AND FRICTIONAL WELDING

BACKGROUND OF THE INVENTION

1. Field of the Invention

The present invention relates to a lightweight plastic composite fastener for use in sandwich-type composite panels and, more particularly, to a plastic composite fastener capable of self-cutting an insert hole in a composite panel and friction welding itself to a panel surface with a computer-controlled machine.

2. Description of Related Art

Lightweight structural panels am commonly formed of a sandwich of two flat resin facings and an intermediate core structure which are bonded together and are frequently used as flooring, bulkheads, and the like in aircraft. Such sandwich panels possess a desirous characteristic of being lightweight, while still providing relative high strength and stiffness needed for structural support in the aircraft.

Various forms of fasteners have been developed to be secured in a hole that has been cut into the aircraft panel, such as the sandwich panel fastener of U.S. Pat. Nos. 3,510,916 and 4,846,612. Sandwich panels can utilize an exterior sheet or skin, such as a glass fiber reinforced polyetherimide, which is then adhered by an adhesive to a core structure. The core structure can be a plurality of strips of metal foil or other thin, lightweight material, such as plastic composite core of NOMEX, which have been bent or molded to form a plurality of honeycomb cells. The opposite side of the core structure is adhered to a similar resin sheet to form a sandwich configuration.

A fastener insert can be installed in a lightweight sandwich panel by first drilling a hole of the desired size for the particular insert. The fastener insert is then inserted within the hole and is usually secured by a potting compound that will harden to provide an anchorage for the insert. Various different methods have been resorted to in an attempt to position the insert into the hole and to hold it in the proper position, while permitting the potting compound to be introduced into the core structure and to set to hold the fastener in its appropriately aligned position. A removable adhesive cover has been utilized to temporarily attach itself to the periphery of the panel, while holding the upper surface of the insert adjacent the panel surface to receive the potting compound. The adhesive cover is subsequently removed when the insert has been appropriately anchored and the surface is cleaned. These procedures are frequently labor intensive.

The prior art is still seeking to optimize the manner of installing inserts in a lightweight panel structure and thereby realize a savings in labor cost.

OBJECTS AND SUMMARY OF THE INVENTION

The present invention is directed to a plastic composite fastener adapted for friction welding in a resin panel. The composite fastener has a plastic molded insert such as a plastic sheath member, with an upper flange member extending from a lower body member of a lesser width than the upper flange member. The upper flange member and the lower body member can have a central opening or a bore that extends axially therethrough. The lower surface of the lower body member can be molded to have an indent about the lower central opening. A metal core member can be mounted within the central opening, and can also be apertured to provide an anchor point for objects which are to be fastened to the panel. The metal core member, for example, can have a threaded aperture to permit a threaded shaft to be removably mounted to a panel.

A lower metal cutting assembly can be fixedly mounted in the indented lower surface of the molded insert lower body member, with at least one cutting edge member extending below the lower surface at a position equal to or greater than the outer perimeter of the lower body member. Preferably the metal cutting assembly can have diametrically opposed cutting edges extending from the ends of a plate and can be fastened to the indented opening at the lower body member. Alternatively, the lower metal cutting assembly can be integrally formed with the inner metal core member for insertion within the plastic molded insert. The plastic molded insert can be preformed by molding or a composite molding can be undertaken with the metal insert positioned in the cavity mold, and then subsequently provided with a molded plastic sheath.

The composite fastener insert unit of the present invention can be automatically installed by providing a composite panel having an upper plastic resin panel, for example, of a polyetherimide. The plastic resin panel can be of a sandwich configuration. The composite fastener insert unit with its lower metal cutting edge or edges can be fastened to a tool such as an externally threaded tool bit, and then rotated so that the lower metal cutting edge will self-cut a hole somewhat larger than the lower body member. When the composite fastener insert unit is positioned within the cut hole, the bit is rotated so that a bearing plate on the bit above the annular flange will force the plastic annular flange against the upper surface of the plastic resin panel, thereby generating sufficient heat so that the upper plastic resin panel will soften and yield to pressure from the bit, while the annular flange will also heat sufficiently to weld the annular flange with the plastic resin panel. The application of the downward force will permit the upper plastic resin panel that has not been in contact with the rotating annular flange to be flush with the upper surface of the annular flange to provide a smooth panel configuration with a welded plastic composite fastener permanently mounted in the panel.

The advantages of the present invention are a significant saving in labor and preparation time for locating and positioning plastic composite fasteners in panels.

Finally, if desired, the welded connection of the thermoplastic fastener insert unit with the sandwich panel can be further supplemented by the provision of potting material to assist in anchoring the fastener insert unit.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 is a perspective view of a composite fastener insert unit that has been installed in a sandwich panel;

FIG. 2 is a perspective view of the underside of a composite fastener insert unit;

FIG. 3 is a perspective view of an inner metal core member;

FIG. 4 is an exploded perspective view of a plastic sheath metal, inner metal core member, and lower metal cutting assembly;

FIG. 5 is a partial cross-sectional view showing the application of a rotatable tool bit to the composite fastener insert unit before it is to contact a sandwich panel;

FIG. 6 is a partial cross-sectional view showing the sandwich panel board with the self-cutting feature of the composite fastener and the lower surface of the annular flange contacting the upper surface of the resin panel;

DETAILED DESCRIPTION OF THE PREFERRED EMBODIMENTS

Figure 7:
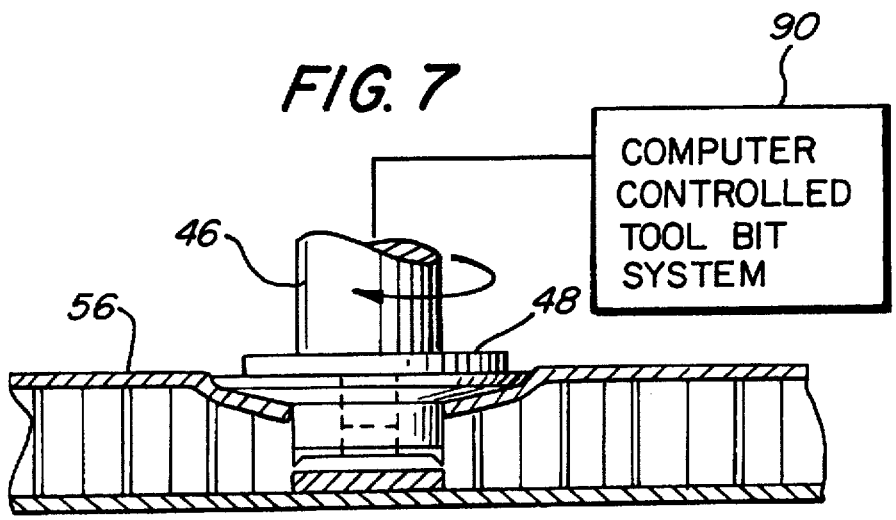
FIG. 7 discloses a partial cross-sectional view of the composite fastener insert unit being welded to the sandwich panel.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an economical plastic composite fastener with self-cutting and frictional welding features that can be automatically installed.

The present invention is directed to a significant savings in labor costs for mounting relatively lightweight plastic composite fasteners into resin panels that are frequently used, for example, in the aircraft industry. Thus, when it is necessary to append an object to such panels, there is a desire to mount fastener units within the panels without destroying the integrity of the panel strength. The composite panels 2, shown, for example, in FIG. 1, usually comprise an upper sheet 4 that is spaced in a parallel manner from a lower flat resin sheet 6. Thin metal ribbing can be bent to form honeycomb cells 8, and they can be appropriately fastened, for example, by adhesive to the respective upper and lower sheets. In addition, the upper and lower resin sheets 4 and 6 can be further formed from plies of warp and waft dominated fabric such as reinforced or unreinforced polyetherimides. Examples of such plastic laminates can be secured from Ten Cate Advanced Composites under the trademark "CETEX." As is well known, such panels are advantageously used in aircraft and other structures requiring a strong and lightweight structure. Other types of thermoplastic resins and plastic composites can be used as panels if they can also be heated to a melting condition by friction rotation. Thus fiberglass panels, thermosetting resin panels, and composite graphite panels can also be used.

The composite fastener insert unit 10, as shown in FIGS. 1 and 2, has an enlarged annular flange 12 that is integrally connected to a lower plastic body member 14, which is shown in FIG. 2 as a cylindrical configuration with a central aperture. The plastic body member 14 and the annular flange 12 can be formed by molding a polyetherimide resin, such as a resin sold by General Electric Company under the trademark "ULTEM." This material has a melting temperature of about 217° C. with excellent surface hardness and mechanical properties. The thermal conductivity of such a plastic material is relatively low compared to metal so that any heat that is generated on a surface of the plastic is not easily transferred to the core of the insert part. As a result, the temperature of the surface layer or flange member 12 can rise relative to the plastic body member 14. Other types of plastic having similar characteristics, to both maintain the integrity of the fastener and enable a friction welding, can be utilized.

Mounted within the aperture of the plastic sheath member formed of the upper flange member 12 and the lower body member 14 is a metal core member 16. The metal core member 16 has a cylindrical tube 18 that is hollow and can be threaded and a cutting plate 20. At either end of the cutting plate 20 are curved cutting edges 22 and 24. The cutting edges 22 and 24 are at a periphery with a greater diameter than the width of the lower plastic body member 14. The cutting edges 22 and 24 are capable of scoring and cutting an appropriately-sized hole in the upper flat resin panel surface 4. The metal core member 16 can be mounted within the aperture of the plastic sheath member.

An alternate embodiment is disclosed in an exploded view of FIG. 4. In this embodiment, a plastic sheath member 26 is molded with a hollow cylindrical bore 28 which terminates in an indented configuration 30 that is complimentary to the outer envelope of a metal core member 32 so that a flange support surface 34 mounts the upper flat plate 36 of the metal core member 32. The metal plate 36 has a pair of parallel sides that are constrained from any relative rotation by walls 38 that extend parallel to the axis of the hollow cylindrical bore 28. The height of the walls is roughly the height or the thickness of the metal plate 36. A solid cutting plate 40 has arcuate cutting edges 42 and 44. The cutting plate 40 can be formed from a metal and, preferably, from a lightweight metal having sufficient strength to cut the plastic panel. An aluminum stamping could be used. As can be seen, the metal cutting plate 40 is separate from the metal core member 32 and can be fastened by an adhesive bonding or a press fit to the plastic sheath member 26. The metal core member 32 can be formed from a harder, more durable metal such as a steel so that its threads will have an increased wear capability.

Thus, the embodiment of the invention disclosed in FIG. 2 is similar to that of FIG. 4, except that a separate cutting plate 40 is used in the embodiment of FIG. 4.

Referring to FIG. 5, a rotatable tool bit 46 having a slightly under-sized annular steel flange 48 with a threaded stud 50 can be rotatably inserted into the fastener insert unit 52. The threaded stud 50 has threads that are compatible with the threaded stainless steel metal or other metallic core member. A composite panel 54 has an upper panel sheet 56 covering a honeycomb cell 58, for example, of thin metal ribbing. The cutting edges 62 on the cutting plate 60 can cut both the upper panel sheet 56 and the honeycomb core cells 58 to form an insert hole for the plastic body member 64.

Referring to FIG. 6, the fastener insert unit 52 has now self-cut its own hole in the composite panel 54, and the underside of its annular flange 66 can now be forced into contact with the upper surface of the panel sheet member 56. The rotatable tool bit flange 48 exerts a downward force while the tool bit 46 is rotated so that a frictional contact occurs between the underside of the annular flange 66 of the fastener insert unit 52 and the upper exterior surface of the panel sheet member 56. For example, the tool bit 46 can rotate at approximately 400–800 rpm for a time period of approximately 10 seconds to generate sufficient heat for an insert unit 52, with an annular flange of approximately 22.5 mm in diameter. Note, the depiction of the hole is only illustrative for teaching the present invention, since debris of the honeycomb panel is not shown. A person skilled in the art can vary the speed and the time to optimize these parameters for a particular fastener insert and a particular plastic material.

During this rotation, the annular flange 66 will soften under the frictional heat, as will the upper skin of the panel sheet member 56 that is in frictional contact. The respective polyetherimide plastic materials of the flange member 66 and the upper panel sheet 56 will soften sufficiently so that it will flow together to, in essence, weld the fastener insert unit 52 directly to the upper panel sheet 56. The upper panel sheet 56 will also deflect in shape, as shown in FIG. 7, from the downward applied force of the tool bit 46 as it is applied through its flange 48, so that the upper surface of the fastener insert flange 66 will be flush with or coplanar with the remaining surface of the upper panel sheet 56. The undersized tool bit flange 48 will help define the flush position with the remaining surface of the sheet 56.

The flange 48 will have a radius of about 0.015-inch less in size than the insert flange 66 and, as shown in FIG. 7, a computer-controlled tool bit machine 90 can be programmed, as known in the art, to automatically locate a defined position, and rotate the drill bit 46 at a desired speed while progressively advancing the fastener insert unit 52 into the panel 56.

Preferably the drill bit 46 will be programmed to drive the fastener insert unit 52 slightly into and below the panel surface by about 0.015-inch and to hold that position for about five seconds to permit bonding. The drill bit 46 will then release to permit the compression force of the panel 56 to move the fastener insert unit 68 slightly upward to be mounted flush with the panel surface. The provision of the slightly undersized flange 48 assists in this flush mounting procedure.

As can be appreciated, the relative dimensions and sizes of an appropriate fastener insert unit can vary, depending upon the particular application and the particular composite panel with which it is to be used.

Figure 8:
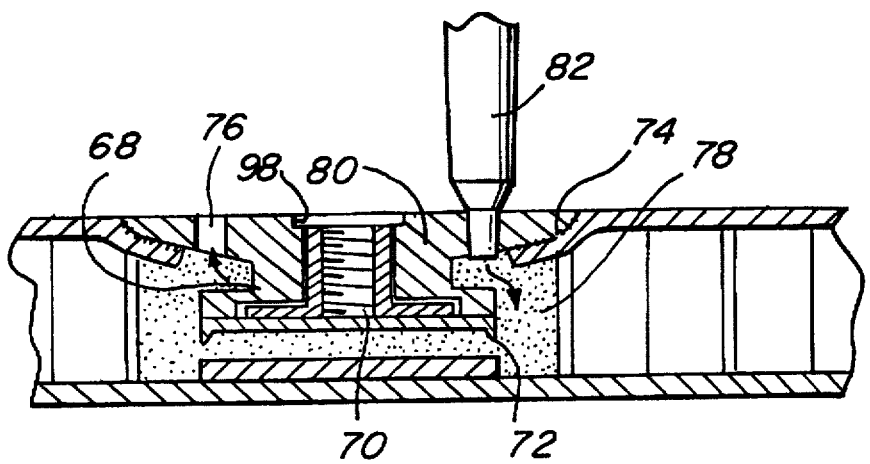
FIG. 8 discloses an alternative embodiment with supplemental potting material.

Another embodiment of the present invention is disclosed in a cross-sectional configuration in FIG. 8. This embodiment is designed to provide additional support for a fastener insert unit 68 by the use of a conventional potting material 78. The fastener insert unit 68 has an enlarged lower cutting plate 70 with appropriate cutting edges 72. The upper annular flange 74 can have at least a pair of holes 76 positioned outward from the lower plastic body member 80, but within the diameter of the cutting edges 72. The holes 76 permit the insertion of a conventional potting material through a nozzle 82 to further anchor the fastener insert unit 68 to the composite panel. The weld portion is only provided on the outer upper flange 74.

Figure 9:
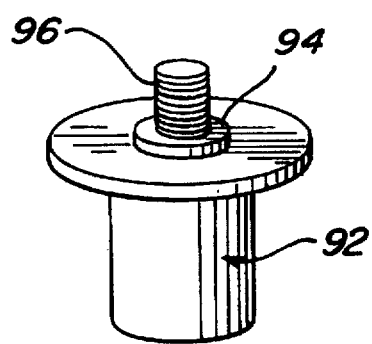
FIG. 9 discloses an alternative tool bit.

Referring to FIG. 9, an alternative drill bit 92 is shown having a centering flange 94 about the base of the threaded stud 96. A corresponding counter-bore 98, as shown in FIG. 8, can permit an initial loose alignment of the metal insert body with the threaded stud 96 during an initial mounting. The alignment of the centering flange 94 and counterbore 98 will then provide a precise position prior to insertion into the panel. The insert body will also tolerate, in operation, a slight misalignment of any thread object initially attached to the panel.

As can be readily appreciated, the use of a self-cutting and self-welding fastener insert unit can provide a substantial labor-saving procedure, wherein a thermoplastic insert unit can be securely mounted in a thermoplastic composite panel. Numerous applications will permit the fastener insert unit to properly function without any precutting of holes or the addition of potting material. In those applications where additional anchoring is desired, the injection of a potting compound into the core and about the plastic body of the fastener insert unit can be accomplished with one version of the present invention.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A plastic composite fastener adapted for friction welding in a resin panel comprising:

an inner core member having at least one curing edge member extending from the core member; and an outer plastic sheath member having a lower body member and an annular flange, the lower body member being fastened to and extending about the core member, the cutting edge member being diametrically exterior to the lower body member at one end of the fastener and located to an outer perimeter position, and the annular flange being located at an other end, and being diametrically larger than the cutting edge member whereby the cutting edge member is configured to cut a hole in the resin panel of a size sufficient to pass the lower body member and the annular flange is configured to friction weld to an upper resin panel surface so that it will be flush with a remaining portion of the resin panel surface that was not in frictional contact.

2. The plastic composite fastener of claim 1 wherein the cutting edge member is a separate insert from the metal core member.

3. The plastic composite fastener of claim 1 wherein the cutting edge member is integral with the core member.

4. The plastic composite fastener of claim 1 wherein the metal core member has an aperture.

5. The plastic composite fastener of claim 4 wherein the metal core member has a flange that contacts a complementary indentation in the lower body member to prevent relative movement.

6. The plastic composite fastener of claim 1 wherein a second cutting edge is provided diametrically opposite the first cutting edge.

7. The plastic composite fastener of claim 1 wherein the plastic sheath member is made from polyetherimide.

8. A plastic composite fastener adapted for friction welding in a resin panel comprising:

a plastic molded insert having an upper flange member extending from a lower body member of a lesser width than the upper flange member, the upper flange member and the body member having a central opening, a lower surface of the lower body member being indented about the central opening;

an inner metal core member positioned within a central opening of the plastic molded insert to enable a securement of objects; and a lower metal cutting assembly being fixedly mounted in the indented lower surface of the lower body member and positioned across the inner metal core member within the central opening, the lower metal cutting assembly having at least one cutting edge member extending below the lower surface and at least at the outer perimeter of the width of the lower body member, whereby the plastic composite fastener can be spun against a panel surface to initially self cut a mounting bore and subsequently frictionally spun to weld only by frictionally heating the upper flange member to the surface of the panel member.

9. The plastic composite fastener of claim 8 wherein the metal core member has an aperture.

10. The plastic composite fastener of claim 9 wherein the metal core member has a flange that contacts a complementary indentation in the plastic sheath member to prevent relative movement.

11. The plastic composite fastener of claim 8 wherein a second cutting edge is provided diametrically opposite the first cutting edge.

12. The plastic composite fastener of claim 11 wherein the cutting edges have a concentric arcuate configuration extending upward from a perimeter of the lower metal cutting assembly.

13. This plastic composite fastener of claim 8 wherein the plastic sheath member is made from polyetherimide.

* * * * *